United States Patent
Villaire et al.

(10) Patent No.: US 9,915,959 B2
(45) Date of Patent: Mar. 13, 2018

(54) DIESEL FUEL TEMPERATURE RELIEF VALVE

(71) Applicants: William L Villaire, Clarkston, MI (US); Jeffrey J Milton, Lake Orion, MI (US); Gordon G Rinke, Sterling Heights, MI (US); Kristen M Demare, Rochester Hills, MI (US)

(72) Inventors: William L Villaire, Clarkston, MI (US); Jeffrey J Milton, Lake Orion, MI (US); Gordon G Rinke, Sterling Heights, MI (US); Kristen M Demare, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1345 days.

(21) Appl. No.: 13/693,728

(22) Filed: Dec. 4, 2012

(65) Prior Publication Data

US 2013/0221118 A1      Aug. 29, 2013

Related U.S. Application Data

(60) Provisional application No. 61/602,420, filed on Feb. 23, 2012.

(51) Int. Cl.

| | |
|---|---|
| *G05D 23/02* | (2006.01) |
| *G05D 23/13* | (2006.01) |
| *F16K 31/00* | (2006.01) |
| *F02M 37/00* | (2006.01) |
| *F02M 37/10* | (2006.01) |

(52) U.S. Cl.
CPC ....... *G05D 23/132* (2013.01); *F02M 37/0035* (2013.01); *F02M 37/106* (2013.01); *F16K 31/002* (2013.01); *G05D 23/022* (2013.01)

(58) Field of Classification Search
CPC .. G05D 23/132; G05D 23/022; F16K 31/002; F02M 37/106; F02M 37/0035
See application file for complete search history.

(56) References Cited

U.S. PATENT DOCUMENTS

| | | | | |
|---|---|---|---|---|
| 4,142,677 A | * | 3/1979 | Ludwig | F02M 25/0836 137/468 |
| 2005/0199845 A1 | * | 9/2005 | Jones | F16K 15/031 251/129.06 |
| 2010/0294476 A1 | * | 11/2010 | Gorni | F16K 31/002 165/276 |

FOREIGN PATENT DOCUMENTS

GB      2074658 A   * 11/1981

OTHER PUBLICATIONS

Manfred et al., Fuel Injection System for Diesel Internal Combustion Engines, Nov. 4, 1981, GB2074658A, Whole Document.*

* cited by examiner

*Primary Examiner* — Larry Furdge

(57) ABSTRACT

A thermostatic valve for a diesel fuel system includes a valve housing and a valve element movable within the housing between a position directing heated diesel fuel returning from an engine to the inlet of a fuel pump and a position dumping the fuel into a reservoir where the fuel mixes with lower temperature fuel. A temperature responsive thermostatic element moves the valve element in response to the temperature of the diesel fuel. A temperature relief valve is provided in the housing to dump the returning fuel into the reservoir if the temperature reaches a temperature indicating overheating of the fuel. The temperature relief valve is a bi-metal valve mounted in an end wall of the valve housing.

18 Claims, 3 Drawing Sheets

DIESEL FUEL TEMPERATURE RELIEF VALVE

FIELD OF THE INVENTION

The present invention relates to a thermostatic valve in a diesel fuel system and more particularly provides a temperature relief valve so that overly heated diesel fuel is not returned to the engine.

BACKGROUND OF THE INVENTION

The viscosity of diesel fuel is sensitive to the temperature of the diesel fuel, such that it is desirable that the fuel reaching the engine is neither overly cold nor overly hot. The prior art has disclosed various methods for achieving improved engine performance by managing the temperature of the diesel fuel supplied to the engine. In one modern solution, diesel fuel that is returning from the engine is routed directly to the fuel pump so that the benefit of heat transferred into the fuel within the engine compartment is retained. This is achieved by a thermostatic valve installed in the fuel return line. When the returning fuel is below a certain threshold temperature the fuel is directed directly to the fuel pump for immediate return to the engine. However, after the fuel temperature reaches an upper threshold, the thermostatic valve will dump the returning fuel into the fuel reservoir so that the heated fuel will become mixed with the larger volume of fuel held in the reservoir. In this way, the engine can be supplied with relatively warmer fuel during engine warm-up and yet the fuel will not be overheated to the detriment of engine performance.

It would be desirable to improve the afore described thermostatic valve to prevent the possibility of returning overly heated fuel to the engine by assuring that the overly heated fuel will be dumped in the reservoir.

SUMMARY OF THE INVENTION

A thermostatic valve for a diesel fuel system includes a valve housing and a valve element movable within the housing between a position directing heated diesel fuel returning from an engine to the inlet of a fuel pump and a position dumping the fuel into a reservoir where the fuel mixes with lower temperature fuel. A temperature responsive thermostatic element moves the valve element in response to the temperature of the diesel fuel. A temperature relief valve in the housing dumps the returning fuel into the reservoir if the temperature reaches a temperature indicating overheating of the fuel. The temperature relief valve is a bi-metal valve mounted in an end wall of the valve housing.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
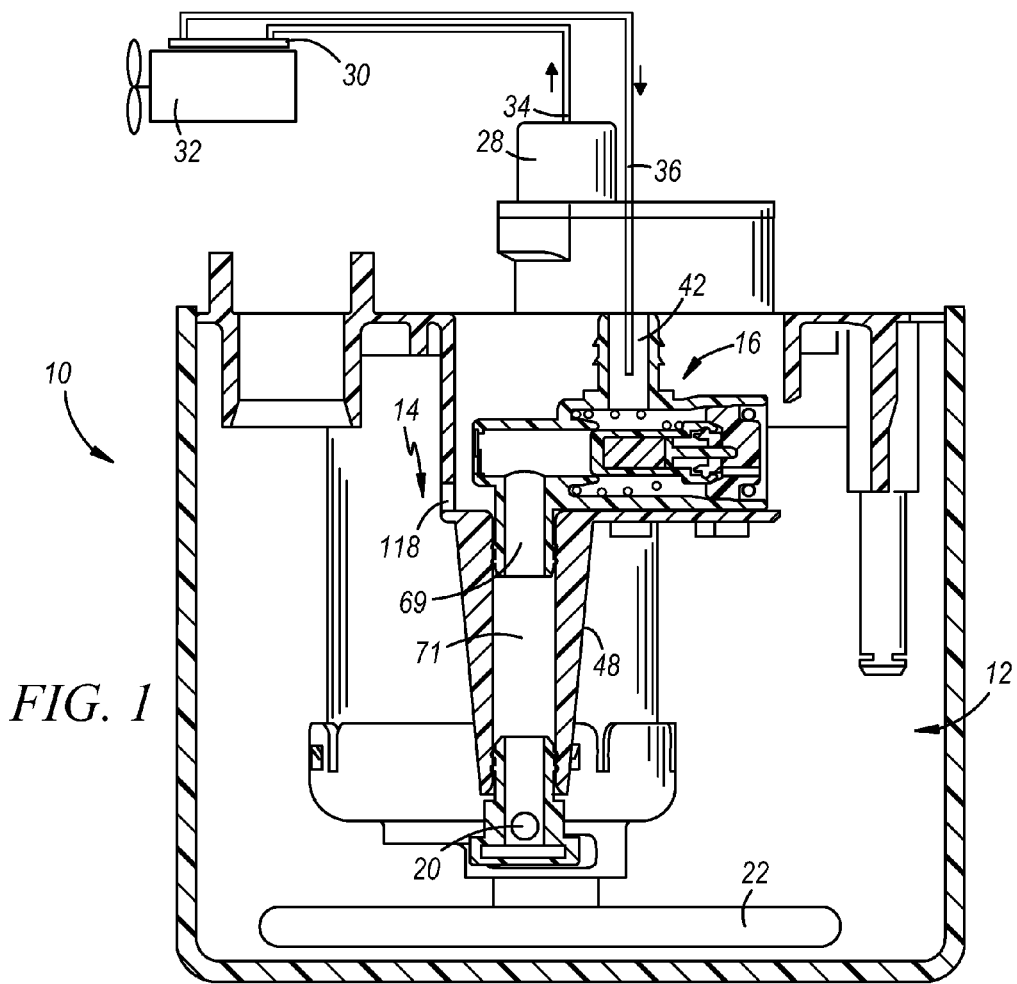
FIG. 1 is an elevation view of a fuel pump module having parts broken away and in section to show a thermostatic valve.

Referring to FIG. 1, a diesel fuel pump module 10 is suspended within a diesel fuel tank. The fuel pump module 10 includes generally a reservoir 12, a fuel pump 14, and a fuel return thermostatic valve 16.

The reservoir 12 is a molded plastic tub that stores a volume of diesel fuel that has flowed into the reservoir 12 from the larger fuel tank. The fuel pump 14 has an pump inlet 20 that receives fuel from the reservoir 12 through a filter assembly 22. The fuel pump 14 has an outlet 28 that is connected to fuel rail 30 of the diesel engine 32 by a fuel supply line 34. The fuel pump 14 can run constantly or intermittently to supply diesel fuel to the fuel rail 30. Excess fuel is returned from the fuel rail 30 by a fuel return line 36 that connects to an inlet 42 of the thermostatic valve 16.

Figure 2:
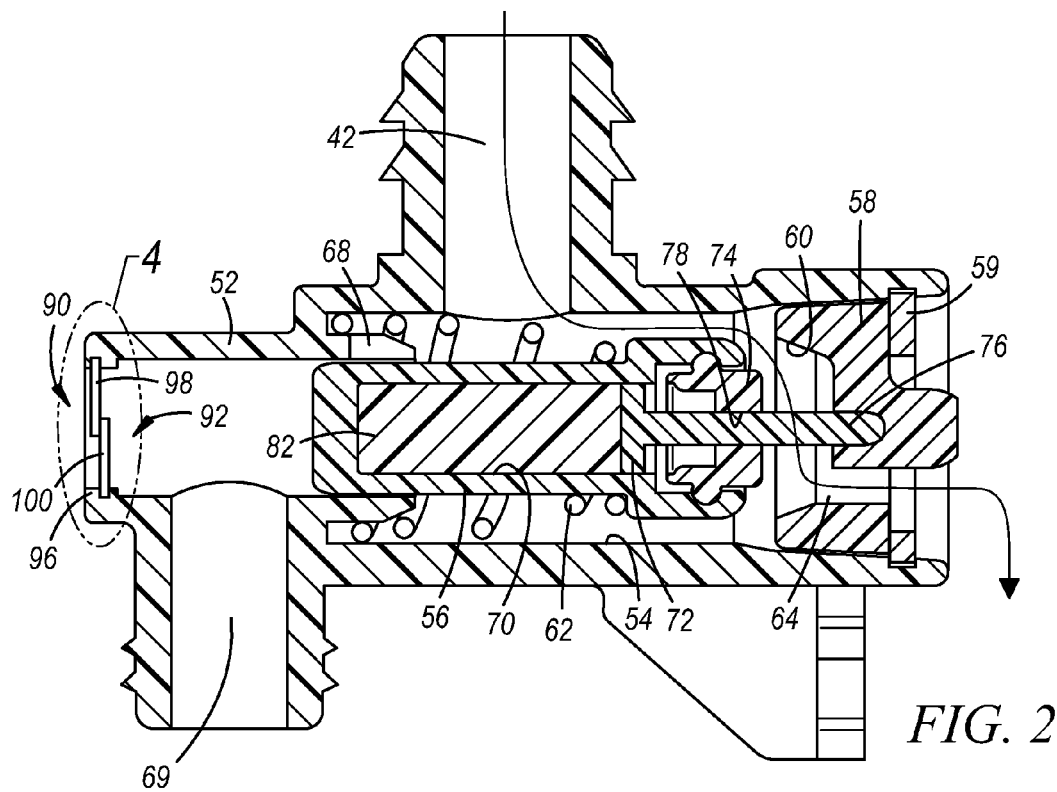
FIG. 2 is an enlarged fragment of FIG. 1 and showing a section through the thermostatic valve.
Figure 3:
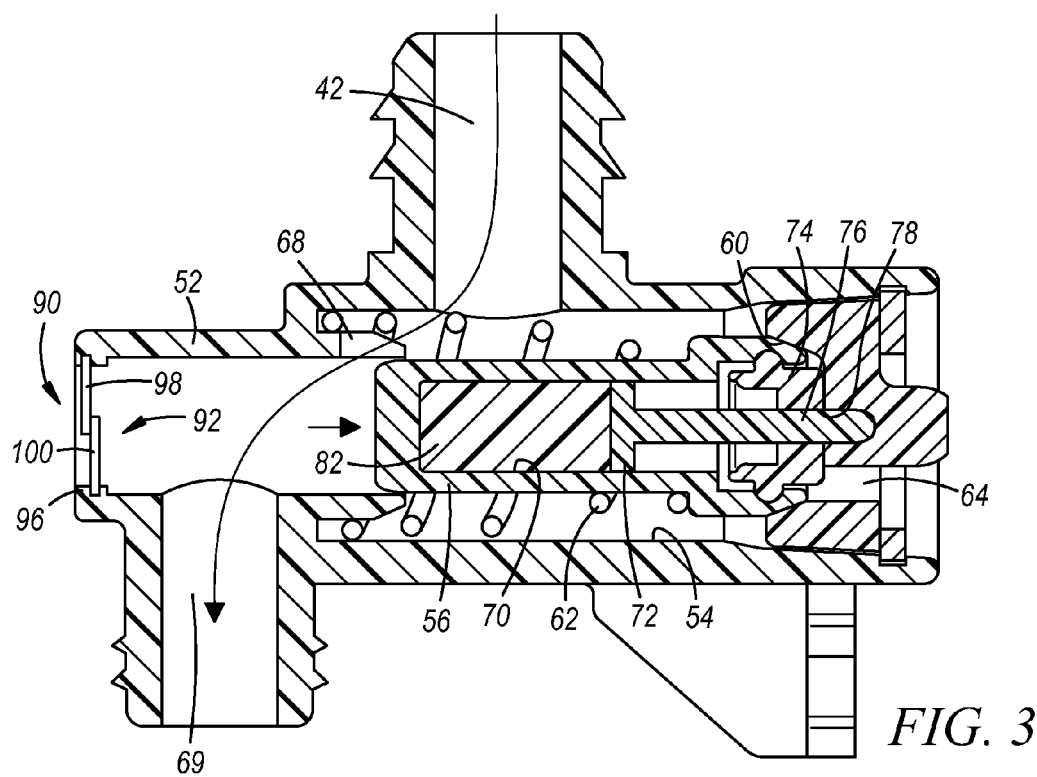
FIG. 3 is a view similar to FIG. 2 but showing the thermostatic valve in a different operating position.

As seen in FIG. 1, the thermostatic valve 16 is mounted within a plastic housing 48 of the fuel pump module. In FIGS. 2 and 3, the thermostatic valve 16 includes a molded plastic valve housing 52 having a cylindrical bore 54 which houses a cylindrical valve element 56 that slides left and right within the cylindrical bore 54. The open right hand end of the cylindrical bore 54 is closed by plug 58. Plug 58 is retained in place by a retaining ring 59. The plug 58 has a valve seat 60 therein and a first outlet port 64 that communicates with the interior of the reservoir 12.

A coil compression valve spring 62 will hold the valve element 56 at its rightward position of FIG. 3 in which the valve element 56 is seated against the valve seat 60 and seals the first outlet port 64. As best seen in FIG. 3, the valve housing 52 also has an second outlet port 68 that becomes opened when the valve element 56 is at its rightward position of FIG. 3. The second outlet port 68 communicates with an outlet 69 of the valve housing 52. And, as seen in FIG. 1, the outlet 69 communicates with a channel 71 of the plastic housing 48 which is open to the pump inlet 20.

The valve element 56 has a bore 70 in which a piston 72 is positioned. The end of the bore 70 is closed by end cap 74 and the piston 72 has a piston rod 76 that extends through a hole 78 in the end cap 74. The end of the piston rod 76 engages with the plug 58 of valve housing 52. A thermostatic element 82 is situated within the valve element 56 for operating the piston 72. The thermostatic element 82 may be a container of temperature responsive wax that expands in volume when exposed to an elevated temperature, and contracts when exposed to a lesser temperature. Upon expansion of the wax in the thermostatic element 82, the piston rod 76 will be extended from the valve element 56 and thereby urge the valve element 56 to move leftwardly against the bias of the valve spring 62 to the position of FIG. 2. In FIG. 2 the valve element 56 has been carried away from the valve seat 60 thereby opening the first outlet port 64 so that diesel fuel returning to the inlet 42 will be communicated through the cylindrical bore 54 to the first outlet port 64 and then into the interior of the reservoir 12.

Referring to FIG. 3 the valve element 56 is shown at its rightward position where the valve element 56 is seated against the valve seat 60 of the plug 58 so that the first outlet port 64 connected with the reservoir is closed. In FIG. 3, the rightward position of the valve element 56 has opened the second outlet port 68 so that the fuel returning from the engine is communicated to outlet 69 and then through channel 71 directly to the pump inlet 20.

Thus, in comparing FIGS. 2 and 3 it is seen that the thermostatic valve 16 will function to direct the returning diesel fuel directly to the pump inlet 20 if the fuel temperature is below a certain threshold, or direct the returning diesel fuel into the reservoir 12 for mixing with a supply of cooler diesel fuel if the returning fuel temperature is above a certain threshold. In particular, in FIG. 3, when the fuel returning from the engine is at a relatively lower temperature the valve element 56 is at its rightward position so that the return fuel is directed through second outlet port 68 to outlet 79 and then directly to the pump inlet 20 of the fuel pump without return to the reservoir 12. On the other hand, in FIG. 2, when the fuel returning from the engine is at a relatively higher temperature, the valve element 56 is at its leftward position so that the second outlet port 68 communicating to the pump inlet 20 is closed, and, instead, the first outlet port 64 is open so that the hot fuel returning from the engine is dumped into the reservoir 12 for mixing and cooling off within the larger volume of diesel fuel that is captive within the reservoir 12.

It will be noted that in the event of erroneous operation of the thermostatic element 82, the valve spring 62 will hold the valve element 56 at its rightward position of FIG. 3 so that the returning fuel will be directed directly to the pump inlet 20. It would be desirable to assure that upon a malfunction of the valve element 56, the fuel cannot become overheated, to the detriment of efficient operation of the engine.

Figure 4:
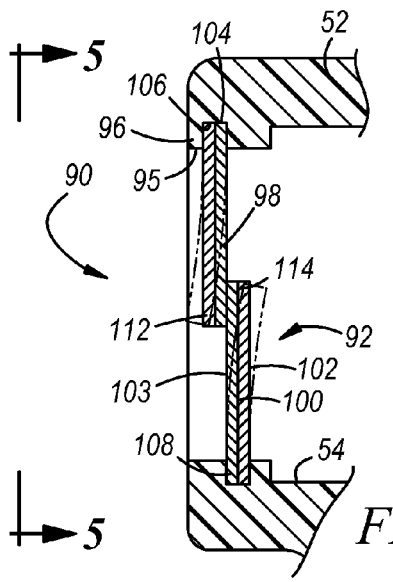
FIG. 4 is an enlarged fragment of the thermostatic valve showing a section through a bi-metal temperature relief valve.
Figure 5:
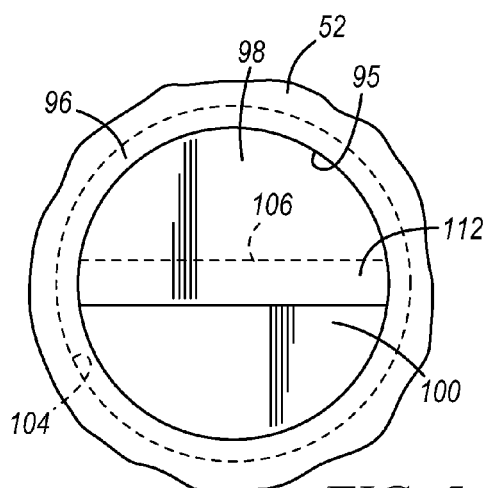
FIG. 5 is an end view of the thermostatic valve showing the bi-metal temperature relief valve of FIG. 4.

Referring to FIGS. 2 and 3, a temperature relief valve 90 generally indicated at 90, is provided in the thermostatic valve 16. In particular as seen in FIGS. 4 and 5, a bi-metal valve assembly 92 is provided in an opening or hole 95 the end wall 96 of the valve housing 52. The bi-metal valve assembly 92 includes an upper valve leaf 98 and a lower valve leaf 100. As best seen in FIGS. 4 and 5, the upper valve leaf 98 is semicircular in shape and has a peripheral edge 104 mounted within a recess 106 of the valve housing 52. Likewise, the lower valve leaf 100 has a peripheral edge 108 that is mounted within the recess 106 of the valve housing 52. The distal end 112 of the upper valve leaf 98 engages the distal end 114 of the lower valve leaf 100, preferably in an overlapping engagement as shown in FIG. 4. The upper valve leaf 98 and lower valve leaf 100 are of conventional bi-metal construction in which sheets of metal having different coefficients of expansion, for example copper sheet 102 and steel sheet 103, are welded are bonded together. Upon exposure to elevated temperature, each valve leaf will become curved such that the upper valve leaf 98 and lower valve leaf 100 will bend to their relative curved position shown in phantom line in FIG. 4. This curving of the upper valve leaf 98 and lower valve leaf 100 functions to open an escape path for the diesel fuel and results in the diesel fuel being dumped through a drain hole 118 into the reservoir 12 rather than being sucked into the pump inlet 20. Thus, the temperature relief valve 90 will prevent overly heated fuel from being immediately returned to the fuel rail 30 of the engine 32 where the fuel would become even more heated.

Figure 6:
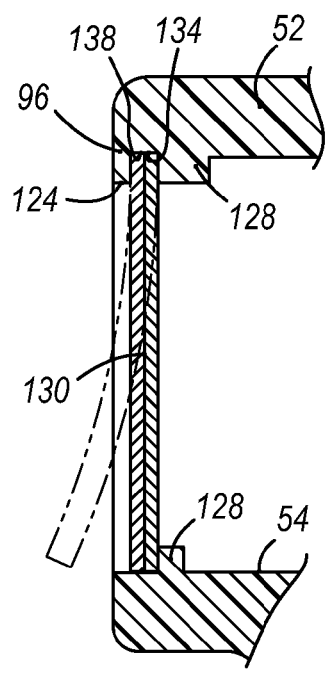
FIG. 6 is a view similar to FIG. 4 showing another embodiment of the bi-metal temperature relief valve.
Figure 7:
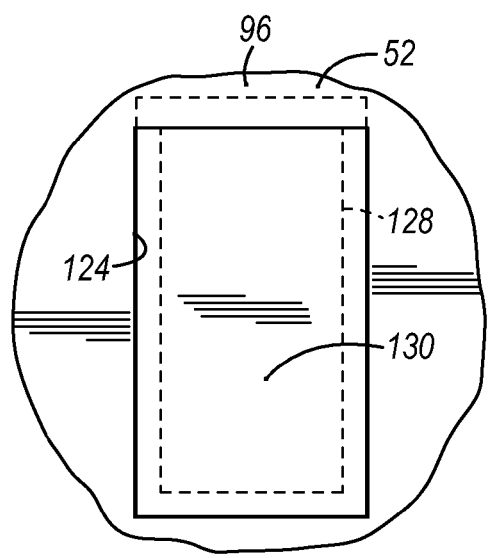
FIG. 7 is an end view of the bi-metal temperature relief valve of FIG. 6.

FIGS. 6 and 7 show another embodiment of the temperature relief valve. A rectangular hole 124 is provided in the end wall 96 of valve housing 52. The hole 124 is framed by a rectangular lip 128. A bi-metal valve includes a single bi-metal leaf 130 of rectangular shape having an upper edge 134 seated within a recess 138 provided in the end wall 96. In FIGS. 6 and 7, the bi-metal leaf 130 is normally closed and seated against the rectangular lip 128 that is framing the hole 124. When exposed to diesel fuel at an elevated temperature, the bi-metal leaf 130 will flex outwardly to the phantom-line indicated position of FIG. 6 so that the overheated diesel fuel will be dumped through the drain hole 95 and directly into the reservoir 12 for mixing with the volume of cooler diesel fuel stored in the reservoir 12.

Upon vehicle start up, the fuel in the diesel tank and reservoir 12 will be at ambient temperature, for example 0 degrees centigrade on a cold morning. At this temperature, the valve element 56 will be positioned as shown in FIG. 3, so that the warmer fuel returning from the engine will be routed to the fuel pump inlet 20, for return to the engine. When the fuel returning from the engine is warmed to a selected temperature of 20 to 40 degrees centigrade, the temperature will cause the thermostatic element 82 to shift the valve element 56 to the position of FIG. 2 so that the returning fuel will be routed through first outlet port 64 and returned to the fuel reservoir 12 for mixing with the ambient temperature fuel.

In the event that the valve element has erroneously remained at the position of FIG. 3, the recirculation of the fuel can warm the fuel to an overly heated condition at a higher temperature that may hamper efficient operation of the engine. The temperature relief valve 90 provided by the bi-metal valve assembly 92 will open at the higher temperature, for example 40 degrees centigrade, to provide a relief path by which the heated fuel can be routed to the reservoir 12 to mix with the ambient temperature fuel in the reservoir 12.

It will be understood that the particular temperatures stated above are examples to illustrate the operation of the system, and in practice the thermostatic valve 16 and its temperature relief valve 90 will be designed to suit the particular design and performance of the engine and fuel system. In addition, although the drawings show the example of a reservoir 12 suspended in a larger fuel tank, that the thermostatic valve 16 and its temperature relief valve 90 can route the heated returning fuel into either the smaller reservoir 12 or the larger fuel tank that communicates with the reservoir 12. Therefore the term reservoir is used herein to mean either the larger tank or the smaller reservoir.

What is claimed is:

1. A thermostatic valve for a diesel fuel system comprising:
    a valve housing;
    a valve element movable within the housing between a position directing heated diesel fuel returning from an engine to the inlet of a fuel pump and a position dumping the fuel into a reservoir where the fuel mixes with lower temperature fuel;
    a temperature responsive thermostatic element for moving the valve element in response to the temperature of the diesel fuel, said thermostatic temperature responsive element establishing the valve element at the position directing heated diesel fuel returning from the engine to the inlet of the fuel pump when the fuel is at ambient temperature and establishing the valve element at the position dumping the fuel into the reservoir where the fuel mixes with lower temperature fuel when the heated diesel fuel reaches a selected higher temperature;

and a temperature relief valve provided in the housing to dump the returning fuel into the reservoir, said temperature relief valve dumping the returning fuel into the reservoir if the temperature of the heated diesel fuel returning from the engine exceeds a selected temperature indicating over heating of the fuel even if the valve element remains in the position directing the heated diesel fuel returning from the engine to the inlet of a fuel pump.

2. The thermostatic valve of claim 1 further comprising the temperature relief valve is one or more bi-metallic leaves mounted in an opening in the valve housing.

3. The thermostatic valve of claim 1 further comprising the temperature relief valve being a plurality of bi-metallic leaves mounted in an opening in the valve housing.

4. The thermostatic valve of claim 1 further comprising the temperature relief valve being located between the valve element and the inlet of the fuel pump.

5. The thermostatic valve of claim 1 further comprising the temperature relief valve being one or more bi-metallic leaves mounted in an opening of the housing at a location where the fuel reaches the one or more bi-metallic leaves when the valve element is in the position directing the fuel to the inlet of the fuel pump, and the bi-metallic leaves open the opening to dump the fuel into the reservoir prior to the fuel reaching the pump inlet.

6. The thermostatic valve of claim 1 further comprising the valve housing being molded plastic and having a bore in which the valve element is slidable, and the temperature relief valve is provided in the molded plastic housing at an end of the bore.

7. The thermostatic valve of claim 1 further comprising the temperature relief valve being one or more bi-metallic leaves mounted in a wall of the housing at the end of a bore of the housing in which the valve element is slidable.

8. The thermostatic valve of claim 7 further comprising the one or more bi metallic leaves being exposed to the returning fuel when the valve element in is the position in which the heated diesel fuel returning from the engine is routed to the pump inlet so that if the fuel is overheated the one or more bi-metallic leaves will open to dump the fuel into the reservoir before reaching the pump inlet.

9. A thermostatic valve for a diesel fuel system comprising:
a molded plastic valve housing having a bore with an end wall;
a valve element movable within the bore of the housing between a position directing heated diesel fuel returning from an engine to the inlet of a fuel pump and a position dumping the fuel into a reservoir where the fuel mixes with lower temperature fuel;
a temperature responsive thermostatic element for moving the valve element in response to the temperature of the diesel fuel;
and a temperature relief valve provided in the end wall of the housing to dump the returning fuel into the reservoir.

10. The thermostatic valve of claim 9 further comprising the temperature relief valve being one or more bi-metallic leaves mounted in an opening in the end wall of the valve housing.

11. The thermostatic valve of claim 9 further comprising the temperature relief valve being a single bi-metallic leaf mounted in an opening in the end wall of the valve housing.

12. The thermostatic valve of claim 9 further comprising the thermostatic temperature responsive element establishing the valve element at the position directing heated diesel fuel returning from the engine to the inlet of a fuel pump when the fuel is at ambient temperature and establishing the valve element at the position dumping the fuel into the reservoir where the fuel mixes with lower temperature fuel when the heated diesel fuel reaches a selected higher temperature.

13. The thermostatic valve of claim 12 further comprising the temperature relief valve dumping the returning fuel into the reservoir if the temperature of the returning fuel exceeds a selected temperature indicating over heating of the fuel even if the valve element remains in the position directing the heated diesel fuel returning from the engine to the inlet of a fuel pump.

14. The thermostatic valve of claim 13 further comprising the one or more bi metallic leaves being exposed to the returning fuel when the valve element in is the position in which the heated diesel fuel returning from the engine is routed to the pump inlet so that if the fuel is overheated the one or more bi-metallic leaves will open to dump the fuel into the reservoir before reaching the pump inlet.

15. The thermostat valve of claim 9 further comprising the temperature responsive thermostatic element for moving the valve element in response to the temperature of the diesel fuel being a material housed within the valve element that expands and contracts in response to temperate to move the valve element within the bore of the housing.

16. A thermostatic valve for a diesel fuel system comprising:
a molded plastic valve housing having a bore with an end wall;
a valve element movable within the bore of the housing between a position directing heated diesel fuel returning from an engine to the inlet of a fuel pump and a position dumping the fuel into a reservoir where the fuel mixes with lower temperature fuel;
a temperature responsive thermostatic element for moving the valve element in response to the temperature of the diesel fuel;
and a normally closed bi-metal temperature relief valve provided in the end wall of the housing and being exposed to the returning fuel when the valve element in is the position in which the heated diesel fuel returning from the engine is routed to the pump inlet so that if the fuel is overheated the normally closed bi-metal temperature relief valve will open to dump the fuel into the reservoir before reaching the pump inlet.

17. The thermostatic valve of claim 9 further comprising the normally closed bi-metal temperature relief valve is one or more bi-metallic leaves mounted in an opening in the end wall of the valve housing.

18. The thermostatic valve of claim 9 further comprising the temperature responsive thermostatic element establishing the valve element at the position directing heated diesel fuel returning from the engine to the inlet of a fuel pump when the fuel is at ambient temperature and establishing the valve element at the position dumping the fuel into the reservoir where the fuel mixes with lower temperature fuel when the heated diesel fuel when the fuel reaches a selected higher temperature.

\* \* \* \* \*